United States Patent [19]

Sudrabin

[11] Patent Number: 5,707,416
[45] Date of Patent: Jan. 13, 1998

[54] METHOD OF RECOVERING BYPRODUCT HEAT DURING COMPOSTING

[76] Inventor: David A. Sudrabin, 2069 Deep Woods Dr., Hendersonville, N.C. 28739

[21] Appl. No.: 651,972

[22] Filed: May 21, 1996

Related U.S. Application Data

[63] Continuation-in-part of Ser. No. 419,524, Apr. 10, 1995, Pat. No. 5,518,922, which is a continuation of Ser. No. 118,617, Sep. 10, 1993, abandoned.

[51] Int. Cl.$^6$ .................... C05F 9/04; C05F 17/00
[52] U.S. Cl. .................... 71/9; 435/290.1; 165/45; 210/151
[58] Field of Search .................... 71/9, 10; 210/151, 210/232; 435/290.1; 165/45

[56] References Cited

U.S. PATENT DOCUMENTS

5,053,124  10/1991  Liane .................................. 210/151
5,518,922   5/1996  Sudrabin ............................... 71/9

Primary Examiner—Ferris Lander

[57] ABSTRACT

The disclosure explains various methods of recovering byproduct heat from a compost stack while the compost stack is in a bacteria active stage. Several beneficial uses of the recovered heat are explained with specific examples given. Usage of the recovered heat to accelerate a bacteria active stage in a second compost stack provides for uniform degradation of the compostable material contained within the second compost stack. This results from reduction of areas within the compost stack which are at differing periods within the composting cycle. Alternatively, usage of the recovered heat to heat a building is explained. Various shapes of aeration plates are explained with examples given.

4 Claims, 6 Drawing Sheets

METHOD OF RECOVERING BYPRODUCT HEAT DURING COMPOSTING

CROSS-REFERENCE

This application is a Continuation-in-Part application of U.S. Ser. No. 08/419,524, entitled "Accelerated Composting Plate and System for Use", filed Apr. 10, 1995, now U.S. Pat. No. 5,518,922; May 21, 1996 which is a File-Wrapper-Continuing application of U.S. Ser. No. 08/118,617, filed Sep. 10, 1993, now abandoned. These applications are incorporated herein by this reference.

BACKGROUND

1. Field of the Invention

Generally, the invention relates to compost systems. More specifically, the invention relates to providing for the productive use of the byproduct heat produced by the compost process.

2. Description of the Prior Art

Various methods exist to provide for large scale composting operations. Generally, these methods involve the depositing of compostable material in large arrays called windrows. Often these arrays are deposited in elongated arrays to enable a plurality of such arrays adjacent one another. This permits compost stacks in various stages of the compost cycle to be fitted into an ordered system. These elongated arrays normally will have a peaked center extending along the longitudinal length of the array. The angle of repose being dependent upon the composition of the material being composted. These arrays often have a significant depth along the center, on the order of five, (5), to eight, (8), feet and occupying a large surface area with a length of between twenty five, (25), and one hundred and fifty, (150), feet.

The stages may include a depositing stage, a bacteria active stage, a transfer stage, a sorting stage and a packaging stage. The depositing stage is where the compostable materials are deposited until a sufficient volume is present in the select array. Following this stage the stack generally is tested at numerous random positions in the stack to determine the moisture content. If the moisture content of the stack is below a predetermined level additional liquid is then sprayed onto the stack and allowed to penetrate therein to bring the moisture content to within the predetermined level desired. This moisture content level is generally at or above thirty, (30), percent range, depending upon the specific material being composted. At this point a controlled bacteria reaction occurs and the compostable material is reduced in volume over a rather long period of time, generally about thirty, (30), to forty five, (45), days. Following the controlled bacteria active stage the composted material often is transferred to a maturation pile or area where the remaining bacteria dies off and the temperature reduces to the ambient temperature. This stage may occupy a significant part of the above mentioned thirty, (30), to forty five, (45), day period. Following this stage the composted material is sorted, which normally involves passage through a screened sorter to remove any large pieces of material. These large pieces then are returned to a stack for continued processing during a subsequent composting cycle. The acceptable composted material is gathered and distributed as a low grade fertilizer or soil amendment. Often other chemicals or additives are added to bring the composition to within required limits to make the material marketable as a packaged fertilizer.

The controlled bacterial active stage produces significant heat within the stack. Temperatures range upwards to the range of about one hundred and fifty, (150), to about one hundred and sixty, (160), degrees fahrenheit. The ideal temperature for the stack is between about one hundred and thirty one, (131), and about one hundred and forty five, (145), degrees fahrenheit.

Some commercial compost systems provide for little or no control over the internal conditions within the stack. Other composting systems provide for monitoring of various internal conditions. Two of the monitored conditions are temperature and moisture content. These systems then attempt to control the bacteria active cycle by varying the moisture content to maintain the temperature between predetermined upper and lower limits.

PFRP, preferred temperature for the reduction of pathogens, require that the stack be maintained over the one hundred and thirty one, (131), degrees fahrenheit for certain periods of time. If this temperature range is maintained pathogens are destroyed and the compost may be marketed as a "safe" product for gardens etc. under the federal specifications.

Conventional composting systems which provide for maintenance of the stack rely upon at least one round pipe. This pipe is laid along the longitudinal length of the stack approximate the center line, when a single pipe is used. The pipes are laid along the longitudinal length of the stack to provide for an even distribution of the pipes within the stack when multiple pipes are used. Each pipe has numerous air outlets along the length for the control of air flow into and out of the base of the stack. These pipes are then connected to an air flow apparatus which permit the manipulation of the air pressure within the pipes. Air flow is then either introduced into the base of the stack or air flow is withdrawn from the base of the stack. Generally, when air is introduced into the base it filters upward through the stack. This normally results in a lowering of the moisture content of the stack. When air is withdrawn from the base outside air filters downward through the stack. When this downward filtering of outside air is combined with the introduction of water to the upper surface of the stack, moisture is then drawn into the stack.

Old style compost operations, those which lack air flow control means, require frequent turning of the stack using a front end loader or some other suitable piece of heavy equipment. This provides for distribution of the material and promotes growth of the bacteria which break down and reduce the materials.

Conventional composting systems permit the bacteria active stage to begin and spread through the stack. This method produces sections within the stack which are in various stages of activity within the bacteria active stage. This non uniformity hinders attempts at maintaining ideal conditions which provide for reduction of the mass within the stack. Various pockets within the same stack may have widely varying temperatures. Therefore, when steps are implemented to provide for creating ideal conditions within the stack based on the sampling taken, certain sections may be adversely affected.

Your applicant is unaware of any system which provides for accurate control over the temperature of the stack while permitting utilization of byproduct heat for other useful purposes. Additionally, your applicant is unaware of the current usage of introducing heat into the length of the base of the stack to encourage the controlled bacteria active stage in a uniform manner throughout the stack.

As such, it may be appreciated that there continues to be a need for a method of providing for introducing heat uniformly at the beginning of the bacteria active stage and for maintaining ideal temperatures within the compost stack during the bacteria active stage while permitting usage of any excess heat removed from the stack. The present invention substantially fulfills these needs.

SUMMARY

In view of the foregoing disadvantages inherent in the known types of composting systems, your applicant has devised a method of recovering heat during a bacteria active stage and methods of providing for productive usage thereof. The recovered heat may be used to enhance the uniform acceleration of a bacteria active stage in a second compost stack. Similarly, the recovered heat may be used to heat a building at the compost site or be stored in a heat sink for later usage. The controlled removal of heat enables control of the temperature within a compost stack within a predetermined range of temperatures.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for recovery of heat from a compost stack for subsequent transfer to an external use.

Other object include;

a) to provide for uniform acceleration of a bacteria active stage in a second compost stack utilizing heat recovered from a first compost stack while the first compost stack is in a bacteria active stage.

b) to provide for heating a building adjacent a compost stack utilizing heat recovered from the compost stack while the compost stack is in a bacteria active stage.

c) to provide for storage in a heat sink of heat recovered from a compost stack while the compost stack is in a bacteria active stage.

d) to provide for controlling the temperature within a predetermined range of temperatures within a compost stack while the compost stack is in a bacteria active stage.

e) to provide for a method of heat recovery from a lower extent of a compost stack.

f) to provide for the method of heat recovery to comprise a system of aeration plates having a manifold conduit area therebeneath.

g) to provide for maintaining the temperature within a compost stack within a predetermined range of temperatures to provide a healthy environment for the productive life cycle of beneficial bacteria.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Referring now to the drawings where like reference numerals refer to like parts throughout the various views. Various composting systems may be employed to provide the several features of the instant invention. A particularly expedient system involves the usage of aeration plates having a manifold conduit area thereunder to provide access to the heat produced by the bacteria active stage of the composting process.

Aeration plates

Figure 1:
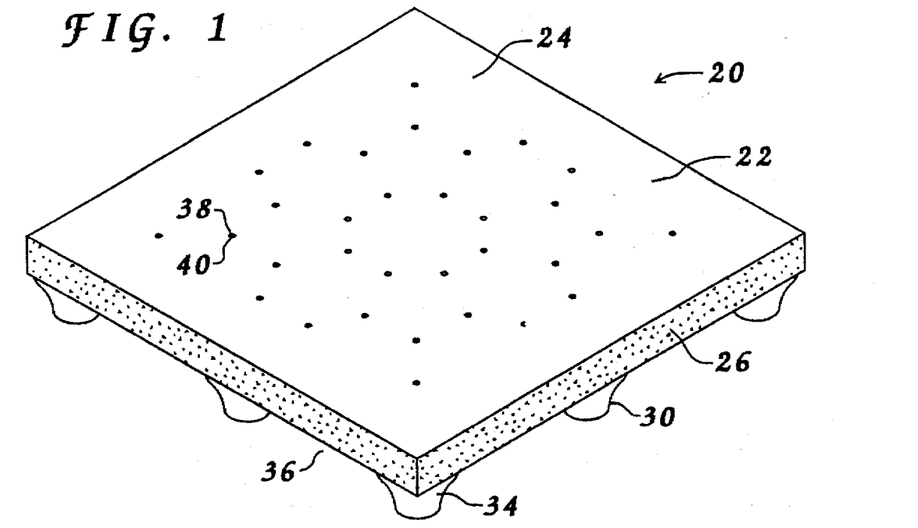
FIG. 1 is a perspective view of the top of an aeration plate.
Figure 2:
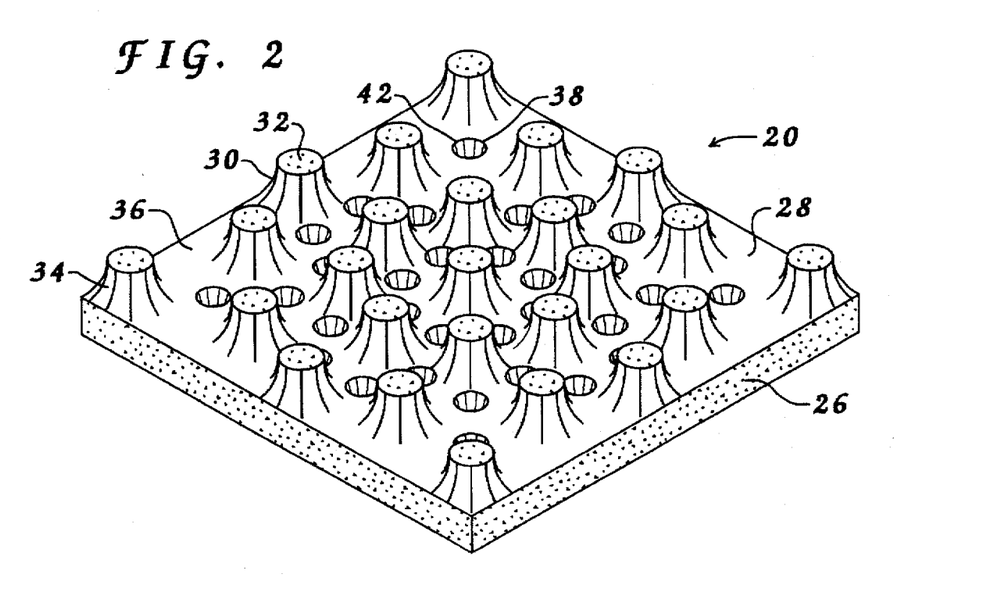
FIG. 2 is a perspective view of the bottom of the aeration plate shown in FIG. 1.
Figure 3:
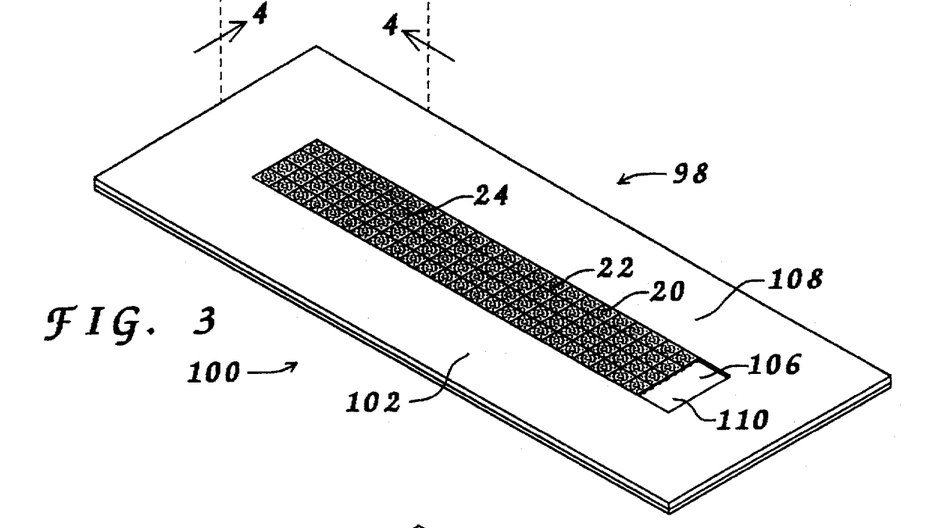
FIG. 3 is a perspective view of a tending bed of a composting system.
Figure 4:
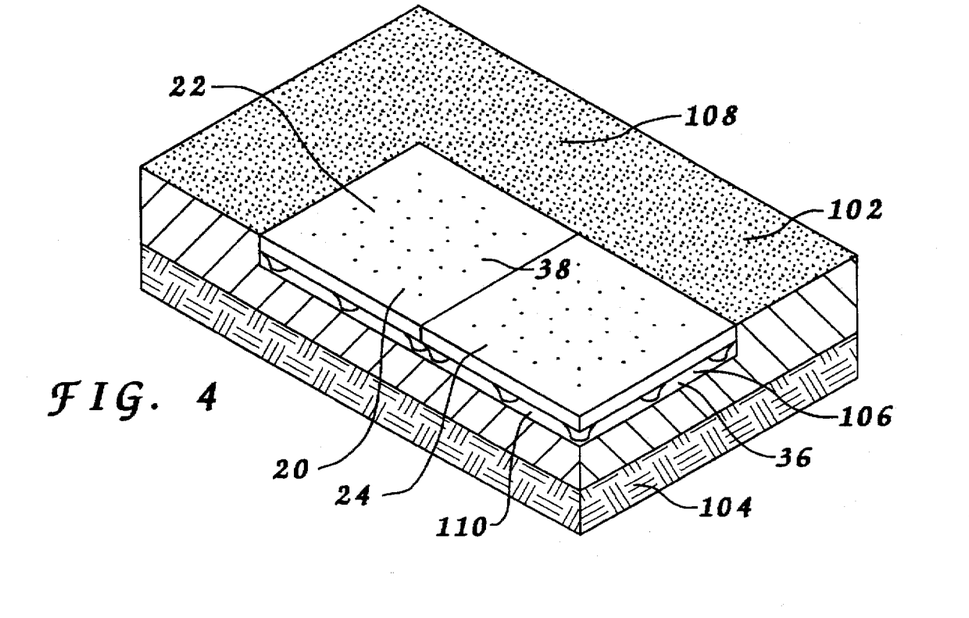
FIG. 4 is a sectional view as taken from the section lines '4' shown in FIG. 3.
Figure 5:
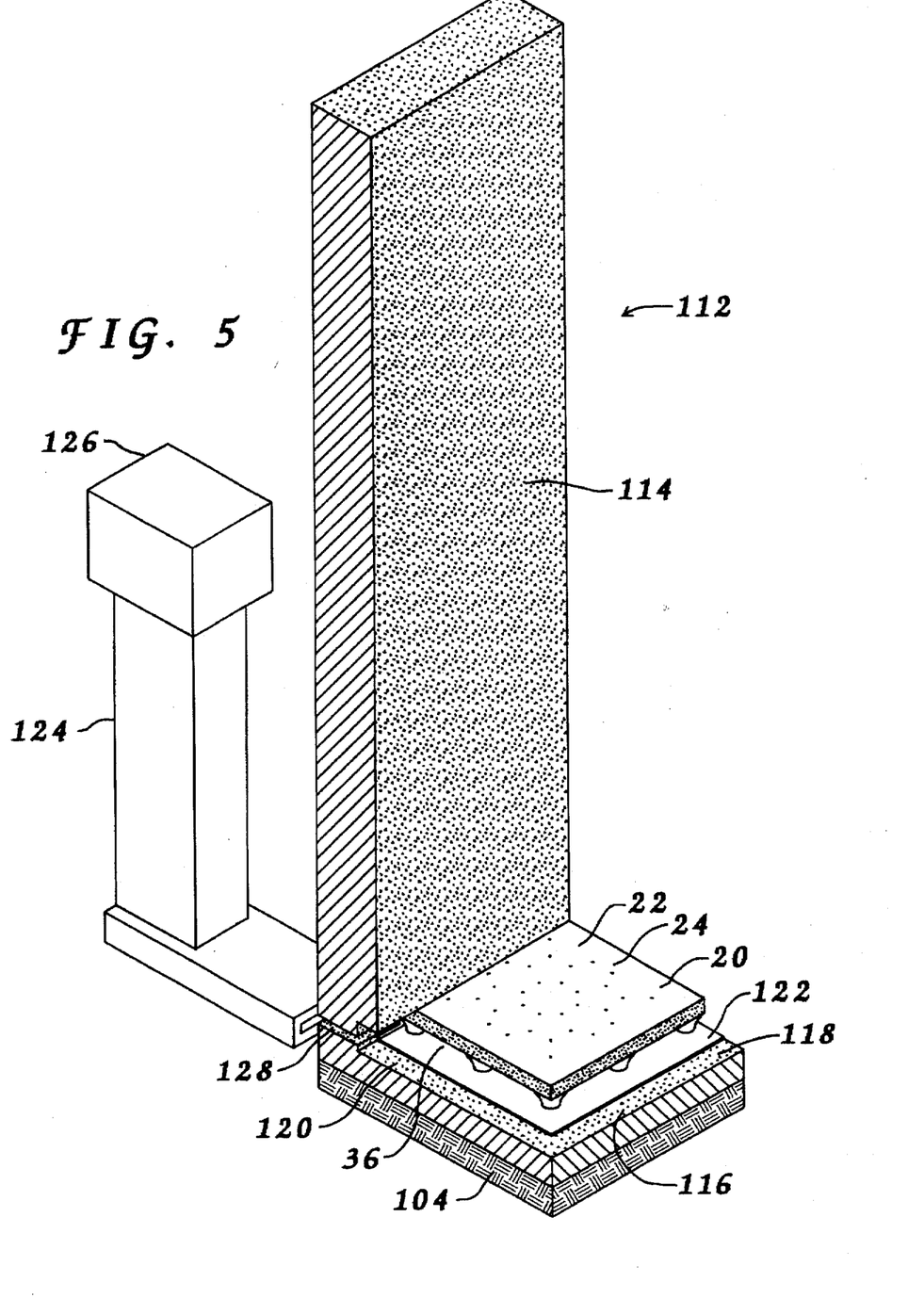
FIG. 5 is a sectional view of an air control system and a retaining wall in a composting system.
Figure 14:
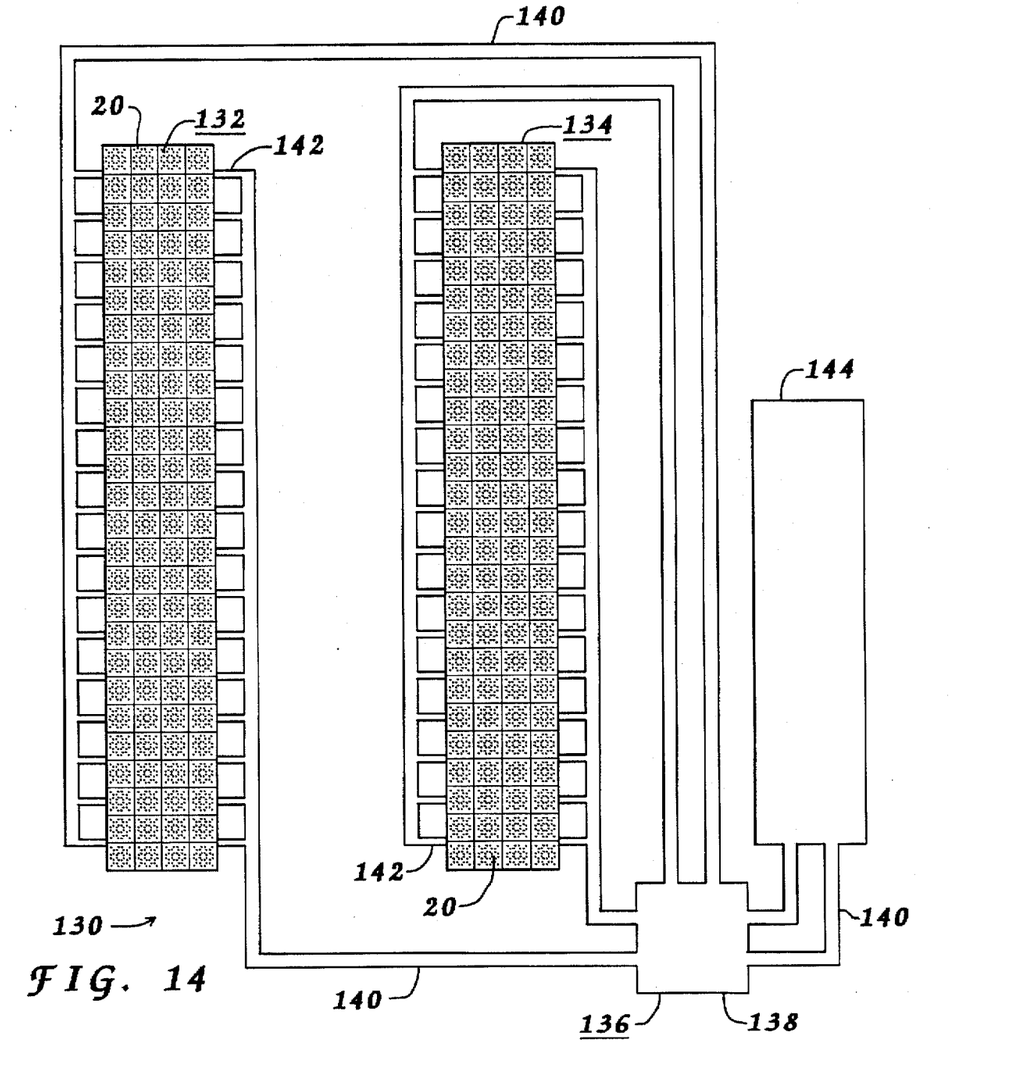
FIG. 14 is an overhead plan view of a composting system having two tending beds and an air control system.

FIG. 1 and FIG. 2 depict opposing views of an aeration plate 20 readily adaptable for deployment in a composting system, as exampled by a composting system 98, shown in FIG. 3 and FIG. 4, a composting system 112, shown in FIG. 5 and a composting system 130 shown in FIG. 14.

Aeration plate 20 has an upper surface 22, shown in FIG. 1, which, when a plurality of aeration plates 20 are deployed in a single layer, as shown in FIG. 3, form a receiving surface 24. Upper surface 22 is surrounded by a plurality of sides 26.

Aeration plate 20 also has a lower surface 28, shown in FIG. 2, which has numerous footers 30 extending therefrom.

Each footer 30 has a base 32 with all bases 32 on each aeration plate 20 sharing a common plane. An expanding side 34 extends upward from each base 32 and blends into lower surface 28. Thus, when aeration plate 20 is placed on a smooth surface with each base 32 contacting the smooth surface a manifold area 36 is present between lower surface 28 and the smooth surface.

Numerous air nozzles 38 penetrate aeration plate 20 from an upper extent 40 on upper surface 22 to a lower extent 42 on lower surface 28. The tapered design of each air nozzle 38 reduces the tendency for air nozzle 38 to become clogged by corn posting material during the compost process. Due to the tendency of adjacent aeration plates 20 to gap slightly when deployed, and thus provide for the passage therethrough of air flow, air nozzles 38 are more numerous toward the center of each aeration plate 20.

Each aeration plate 20 may be formed of any suitable material, as exampled by concrete, with a reinforcing fiber preferably incorporated therein to increase the strength of each aeration plate 20. Air nozzles 38 may be incorporated into the design of the mold or drilling may occur following the molding process to install air nozzles 38 into each aeration plate 20.

Aeration plate 20, shown in FIG. 1 through FIG. 5, FIG. 12 and FIG. 14, have four, (4), sides. This type of design is deployable in various patterns as exampled by a placement pattern 44 shown in FIG. 12. This type of design provides for a receiving surface 46 which permit movement along aligned rows if a single plate becomes displaced. Several other shapes are viable including aeration plates having six, (6), identically dimensioned sides. FIG. 6 through FIG. 11 and FIG. 13 illustrate one design for an aeration plate 48 having such a design. This type of design provides for a receiving surface 50 which are deployable in a placement pattern 52 shown in FIG. 13. This design eliminates rows or columns which may shift without disturbing adjacent rows or columns and therefore tends to lock the plates into the overall placement.

Figure 6:
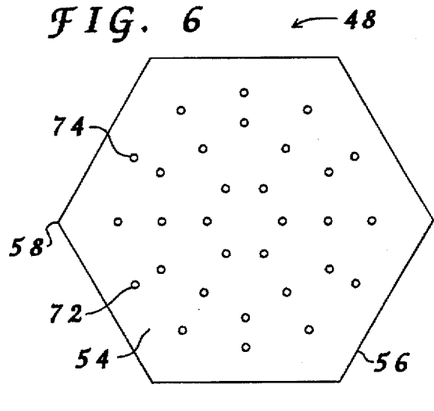
FIG. 6 is an overhead plan view of an aeration plate.
Figure 13:
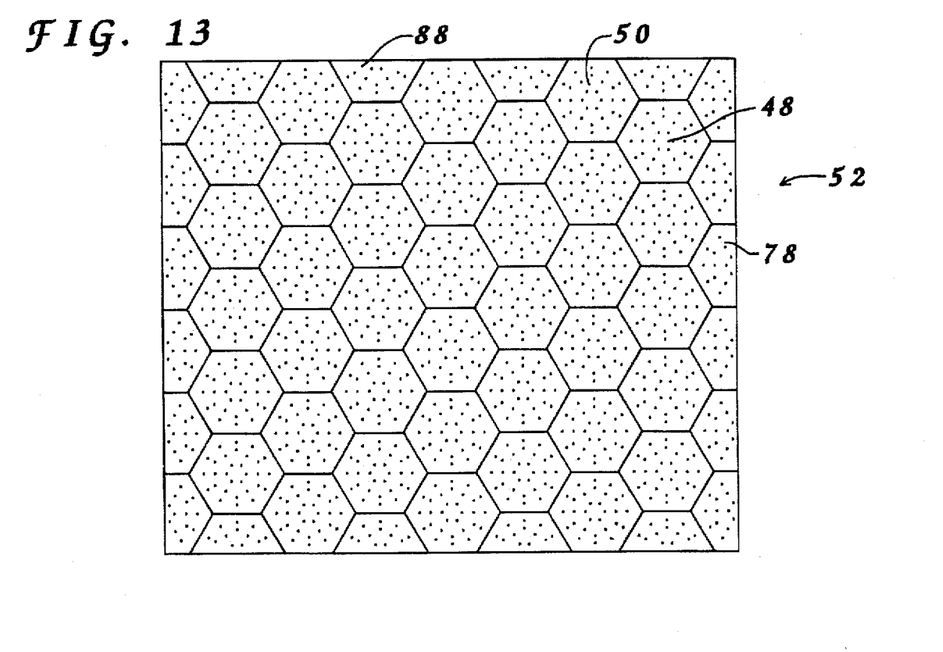
FIG. 13 is an overhead plan view of a placement pattern formed by certain aeration plates or cut sections therefrom.

Aeration plate 48 has an upper surface 54, shown in FIG. 6, which, when a plurality of aeration plates 48 are deployed in a single layer, as shown in FIG. 13, form receiving surface 50. Upper surface 54 is surrounded by a plurality of sides 56 with each intersection of adjacent sides 56 defining a corner point 58. Aeration plate 48 also has a lower surface 60, shown in FIG. 7, which has numerous footers 62 and a plurality of partial footers 64 extending therefrom. Preferably, footers 62 and partial footers 64, if used, are distributed in such a manner as to avoid aligned rows across aeration plate 48. Aligned rows significantly weaken the plate by providing linearly aligned stress planes within the plate. Such a distribution of footers is preferred regardless of the perimeter shape of the plate. Each footer 62 has a base 66 with all bases 66 on each aeration plate 48 sharing a common plane. An expanding side 68 extends upward from each base 66 and blends into lower surface 60. Thus when aeration plate 48 is placed on a smooth surface with each base 66 contacting the smooth surface a manifold area 70 is present between lower surface 60 and the smooth surface.

Figure 7:
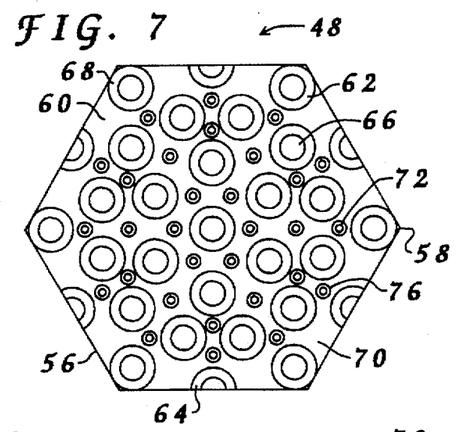
FIG. 7 is a bottom plan view of the aeration plate shown in FIG. 6.
Figures 8, 9:
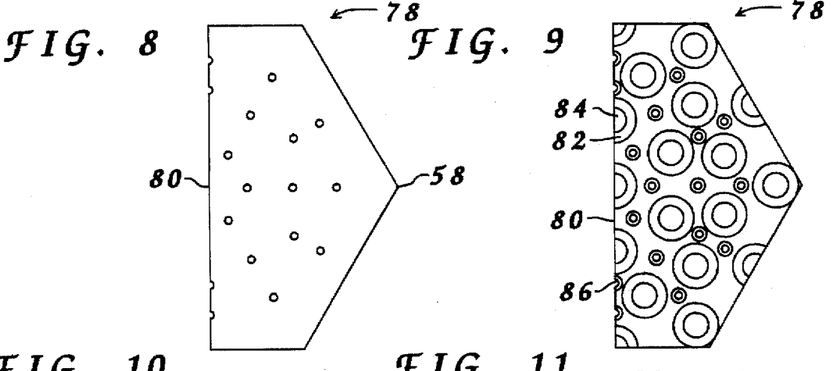
FIG. 8 is an overhead plan view of a sectioned aeration plate as formable from the aeration plate shown in FIG. 6.
FIG. 9 is a bottom plan view of the sectioned aeration plate shown in FIG. 8.
Figures 10, 11:
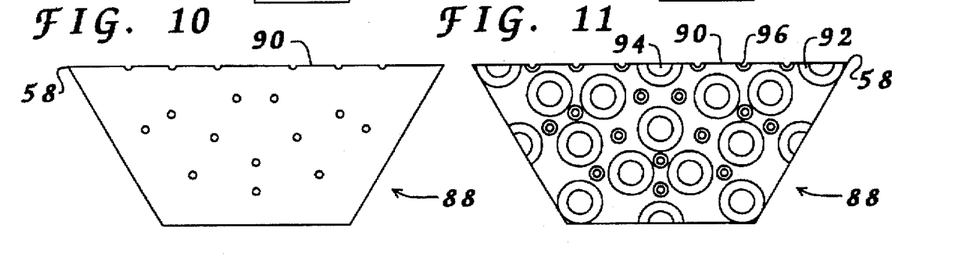
FIG. 10 is an overhead plan view of a sectioned aeration plate as formable from the aeration plate shown in FIG. 6.
FIG. 11 is a bottom plan view of the sectioned aeration plate shown in FIG. 10.
Figure 12:
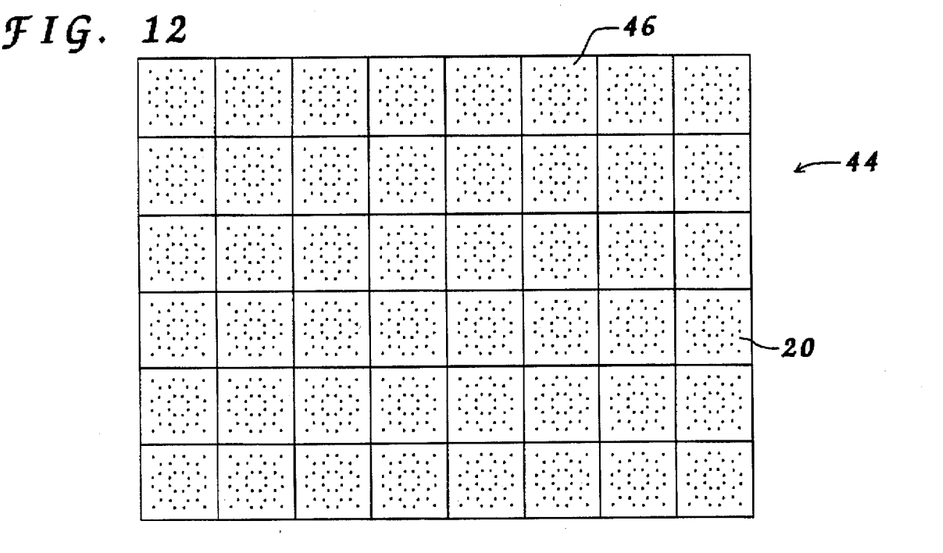
FIG. 12 is an overhead plan view of a placement pattern formed by certain aeration plates.

Numerous air nozzles 72 penetrate aeration plate 48 from an upper extent 74 on upper surface 54 to a lower extent 76 on lower surface 60. The tapered design of each air nozzle 72 reduces the tendency for air nozzle 72 to become clogged by corn posting material during the compost process. Due to the tendency of adjacent aeration plates 48 to gap slightly when deployed, and thus provide for the passage therethrough of air flow, air nozzles 72 are more numerous toward the center of each aeration plate 48.

It is desirable to have each perimeter edge of each placement pattern define a straight line. When aeration plates 48 are deployed, as shown in FIG. 13, it is necessary to section certain aeration plates in order to have linearly aligned perimeter edges. Cutting a single aeration plate 48 into two, (2), equal parts permits full, or nearly full, utilization of aeration plates 48. There are two primary section lines on each aeration plate 48. The first, shown in FIG. 8 and FIG. 9, involves cutting from the midpoint on one, (1), side 56 to the midpoint on the opposing side 56 and forms two, (2), sectioned aeration plates 78. This results in a cut side 80 which intersects several air nozzles 72 and several footers 62. This results in several sectioned footers 82, each having a sectioned base 84, and several sectioned air nozzles 86 along cut side 80. The second, shown in FIG. 10 and FIG. 11, involves cutting from one, (1), corner point 58 to the opposing corner point 58 and forms two, (2), sectioned aeration plates 88. This results in a cut side 90 which intersects several air nozzles 72 and several footers 62. This results in several sectioned footers 92, each having a sectioned base 94, and several sectioned air nozzles 96 along cut side 90.

Composting system

FIG. 3 shows a typical deployment of aeration plates 20 to form composting system 98 having a tending bed 100. A support material 102, as exampled by steel reinforced concrete, is situated over earthen ground 104, shown in FIG. 4. Support material 102 has a plate area 106 and a surrounding surface 108. Plate area 106 has a support surface 110 which will receive a plurality of aeration plates 20. Support surface 110 is recessed relative to surrounding surface 108 to permit insertion therein of a single layer of aeration plates 20. Plate area 106 depicted holds twenty-six, (26), rows with each row having four, (4), aeration plates 20. Therefore, plate area 106 holds one hundred and four, (104), aeration plates 20 while eight, (8), aeration plates are depicted removed from the lower right hand side within FIG. 3. Upper surfaces 22 of each aeration plate 20 cooperates to form receiving surface 24 upon which would be piled the material to be subjected to the compost process. As shown in FIG. 4, the plurality of aeration plates 20 cooperate to define manifold area 36 between support surface 110 of plate area 106 and all lower surfaces 28 of the deployed aeration plates 20.

Composting system 98, shown in FIG. 3 and FIG. 4, permits a heap piling method to be employed. With this method a stack of compostable material is placed along the longitudinal length of tending bed 100 so as to completely cover all deployed aeration plates 20. This material will extend outward to partially cover surrounding surface 108. A cross section view of this stack would have sloped sides having a certain angle of incline, which would be dependant, in part, upon the composition of the material involved.

During usage, air flow would be selectively employed to permit air to be either draw downward through aeration plates 20, and therefore through the compost stack, into manifold area 36 or forced upward through aeration plates 20, and therefore through the compost stack, out of manifold area 36. Air nozzles 38, and any slight separation between adjacent aeration plates 20, provide for this passage through aeration plates 20. The structure required to provide this controlled air flow is not shown within these views.

Composting system 112, shown in FIG. 5, permits a restricted area placement method to be employed. With this method compostable material is placed with lower confinement which cooperates with perimeter confinement. This method provides for the most uniform method of tending the compostable material during the composting cycle. This is due to the elimination of perimeter expansion of the compost stack beyond the limits of the aeration plates, which provide control of air flow.

A retaining wall 114 extends upward from a support surface 116. Both retaining wall 114 and support surface 116 are constructed of a support material 118 which may be any suitable material, as exampled by steel reinforced concrete. A plate area 120 receives a single layer of aeration plates 20. A liner 122 is shown positioned between aeration plates 20 and support surface 116 to prevent seepage of liquids into earthen ground 104. Manifold area 36 exists between aeration plates 20 and support surface 116 and permits movement of air therein.

An air control system 124 comprises an air flow pump 126 and an air flow passage 128 through retaining wall 114. Air flow passage 128 permits air flow pump 126 to provide control over air flow within manifold area 36. This controlled air flow can be either positive pressure or negative pressure.

FIG. 14 depicts composting system 130 which comprises a first tending bed 132, a second tending bed 134 and an air control system 136. Air control system 136 further comprises an air flow pump 138, various air flow pipes 140 and various air flow passages 142 extending into respective tending beds 132 and 134 from opposing ends thereof. Each tending bed 132 and 134 comprises a plurality of aeration plates 20 having a respective manifold area, as previously explained, thereunder. Each air flow passage 142 provides access to the manifold area of the respective tending bed 132 or 134. Temperature monitoring means are incorporated within air control system 136 to monitor the temperature of the compost stack situated on first tending bed 132 and second tending bed 134.

Therefore, air flow pump 138 may produce control over air flow into, out of or through a select tending bed 132 or 134. Numerous use of the heat produced by the bacteria active stage of a composting cycle on tending bed 132 or 134 may make use of this recovered heat. One example of such a use involves the transfer of heat from one, (1), tending bed 132 or 134 to the other tending bed 132 or 134. This transfer may then heat the compostable material stacked thereupon to accelerate the bacteria active stage therein. Another example of such a use involves the transfer of heat from one, (1), tending bed 132 or 134 to a building 144 to provide heat therein. This sort of usage is particularly desirable in northern climates where heating of such spaces consumes considerable expenditure.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of recovering byproduct heat from a compost stack while the compost stack is in a bacteria active stage, the method comprising the steps of:

a) providing a composting system comprising:

1) a plurality of aeration plates to receive the compost stack thereupon;

2) a support surface to provide for receiving the aeration plates in a single layer;

3) a perimeter barrier surrounding the single layer of aeration plates;

4) a manifold conduit area between the support surface and the single layer of aeration plates and at least partially surrounded by the perimeter barrier;

5) numerous air passages from the manifold conduit area through the single layer of aeration plates;

6) air flow means to provide for moving air flow within the manifold conduit area;

b) providing heat recovery means to provide for transferring heat from beneath the compost stack to an external usage;

whereby the compost stack produces heat as a byproduct of the bacteria active stage and the heat recovery means transfers the heat for the external usage.

2. The method defined in claim 1 wherein the external usage comprises heating a building adjacent the composting system.

3. The method defined in claim 1 wherein the external usage comprises introduction of the heat into the lower extent of a second compost stack to uniformly accelerate a bacteria active stage within the second compost stack.

4. The method defined in claim 1 further comprising range maintenance means to provide for control of temperatures within the compost stack within a predetermined range of temperatures.

\* \* \* \* \*